United States Patent [19]
Feltz et al.

[11] 3,969,246
[45] July 13, 1976

[54] CHROMIUM REMOVAL AND RECOVERY PROCESS

[75] Inventors: Edward J. Feltz, Dayton; Ross Cunningham, Mount Gilead, both of Ohio

[73] Assignee: John Cunningham, Portsmouth, Ohio

[22] Filed: Aug. 26, 1974

[21] Appl. No.: 500,606

[52] U.S. Cl. .................................. 210/45; 210/53; 210/DIG. 25
[51] Int. Cl.² .......................................... C02C 5/02
[58] Field of Search ................... 210/50, 51, 53, 42, 210/45, 49, DIG. 25

[56] References Cited
UNITED STATES PATENTS

| | | | |
|---|---|---|---|
| 3,371,034 | 2/1968 | Richards | 210/51 |
| 3,575,853 | 4/1971 | Gaughan et al. | 210/50 X |
| 3,728,273 | 4/1973 | Bruen et al. | 210/51 X |
| 3,869,386 | 2/1975 | Izdebski | 210/53 |

Primary Examiner—Thomas G. Wyse
Attorney, Agent, or Firm—Biebel, French & Nauman

[57] ABSTRACT

The present disclosure is directed to a process for removing and recovering chromium from waste water in the form of chromic acid and/or metallic chromate salts by the direct precipitation of chromium using barium carbonate in aqueous solutions acidified with glacial acetic acid at an acidic pH preferably ranging from 4.5 to 4.7 followed by filtering the resultant chromium material with an acid resistant filter media having openings preferably in the 2 to 4 micron size range and acid-resistant within the pH range of 2 to approximately 5. The weight ratio of barium carbonate to chromium material contained in the waste liquid is preferably 2:1 and the preferable weight ratio of the barium carbonate to the acetic acid is preferably 3:1. The barium carbonate and acetic acid are freshly mixed in aqueous media prior to either addition to the chromium waste liquid or addition of the chromium waste liquid to the freshly prepared treating material in aqueous media.

9 Claims, 1 Drawing Figure

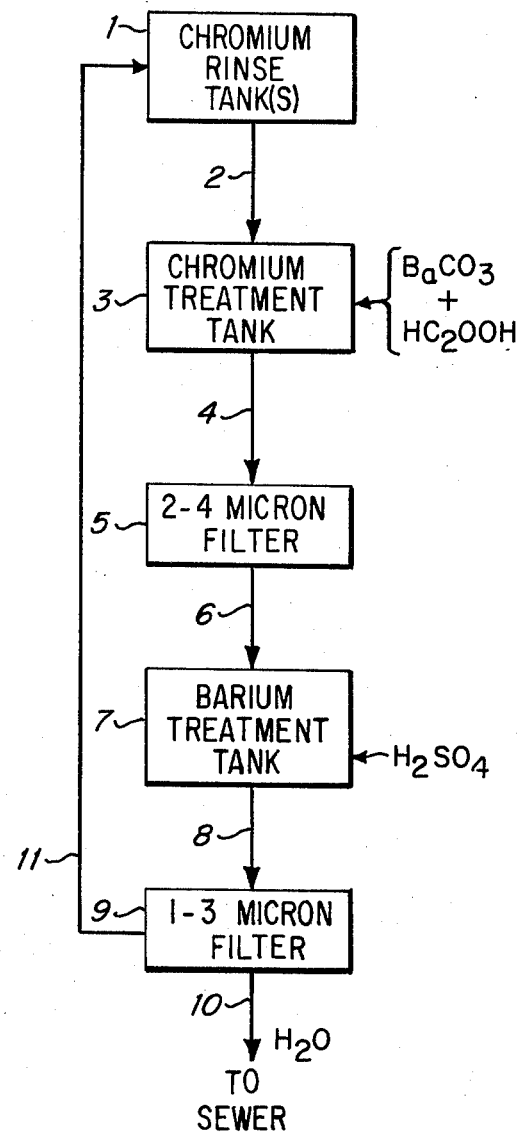

CHROMIUM REMOVAL AND RECOVERY PROCESS

BACKGROUND OF THE INVENTION

This invention relates to the treatment of industrial waste waters containing chromium, e.g., in the form of chromic acid, metallic chromate salts, etc. Such chromic materials can no longer be discharged directly into sewers, rivers or streams due to various legal requirements imposed by the environmental authorities. Also, chromium is an expensive metal and the treating solutions and salts are desirably recovered from the economic point of view. An economical process for not only removing chromium from waste waters but also recovering it efficiently has long been desired.

One prior-art method for purifying industrial waste waters containing chromium materials evolves about reducing the chromium, viz., chromic ion, with sulfur dioxide, sodium bisulfite, or like materials, followed by a subsequent precipitation of the chromium with a basic substance such as lime (calcium hydroxide) or similar material. The precipitated chromium is then filtered.

Another prior-art process involves the precipitation of chromium with barium in acidic aqueous media utilizing a strong acid followed by filtration to remove the precipitated chromium. The latter procedure, involving direct precipitation of chromium, is not only more expensive than the sulfur dioxide reduction-lime precipitation process, but also adds the additional problem of removal of barium from the waste waters prior to discharge. Such prior art barium precipitation treatment procedures result in unacceptably high concentration of barium waste the wate water necessitating removal thereof prior to discharge into sewers, rivers or streams. U.S. Pat. No. 3,371,034 to Richards illustrates a direct precipitation procedure utilizing barium carbonate in aqueous solutions acidified with strong acids such as nitric or hydrochloric acid or their salts. Such prior art procedures also encounter difficulties in separation of the chromium solids from the liquid waste media necessitating the use of one or more settling tanks, the use of which is avoided in accordance with the process of this invention.

SUMMARY OF THE INVENTION

The present invention is directed to a process for removing and recovering chromium from waste water in the form of chromic acid and/or metallic chromate salts by the direct precipitation of chromium using barium carbonate in aqueous solutions acidified with glacial acetic acid at an acidic pH preferably ranging from 4.5 to 4.7 followed by filtering the resultant chromium material with an acid resistant filter media having openings preferably in the 2 to 4 micron size range and acid-resistant within the pH range of 2 to approximately 5. The weight ratio of barium carbonate to chromium material contained in the waste liquid is preferably 2:1 and the preferable weight ratio of the barium carbonate to the acetic acid is preferably 3:1. The barium carbonate and acetic acid are freshly mixed in aqueous media prior to either addition to the chromium waste liquid or addition of the chromium waste liquid to the freshly prepared treating material in aqueous media.

Accordingly, it is an object of the present invention to provide both an environmentally sound and economical process for removing and recovering chromium material from industrial waste solutions through the addition of barium carbonate and acetic acid treating materials.

Other objects and advantages of the present invention will be apparent from the accompanying drawing, the specification and appended claims.

BRIEF DESCRIPTION OF THE DRAWING

The sole FIGURE of the drawing is a flow chart illustrating the treating process of this invention.

DESCRIPTION OF THE PREFERRED EMBODIMENTS

The process of the invention is illustrated in the sole FIGURE of the drawing which is a flow chart illustrating the process of this invention in treating chromium waste or rinse waters. As a result of a chromium plating process, the plated parts are rinsed in one or more rinse tanks, the last of which is usually a hot rinse tank.

As parts are rinsed in the rinse tank(s) 1, the solution therein builds up with contaminating chromium ions. In this process, the contaminated rinse water from one or more rinse tanks is removed for treatment through line 2 or by free flow from the rinse tank(s) to treatment tank. The rinse water in the treatment tank is then treated with the barium carbonate and acetic acid constituents in the proper concentration relative to the amount of chrome in the contaminated water as indicated by the arrow thereon.

The treatment tank 3 is equipped with conventional agitation, preferably air, and the agitated solution in the treatment tank is then fed through line 4 to a 2 - 4 micron filter 5. If further processing is required, the filtered effluent is then fed through line 6 to an additional holding tank 7 or self-contained filtering system where sulfuric acid or similar material is added to precipitate the slight remaining barium, e.g., as barium sulfate, as indicated by the arrow.

The resulting effluent is fed through line 8 to a 1 - 3 micron filter 9 to capture the barium sulfate. The resulting effluent can be removed directly to the sewer, river or stream through line 10 or, in a continuous operation, back to the original rinse tank(s) through line 11 for reuse.

The present invention involves the carefully controlled use of barium carbonate and acetic acid within specified pH ranges to directly precipitate chromium materials of the type found in industrial waste waters, for example, the rinse solutions of chromium plating operatings and dipping procedures, by removing therefrom the chromium ions and other heavy metal constituents in such waste waters as an easily separable precipitate, which precipitate contains substantially all of the chromium ion and other metallic ions which were present in the waste waters, e.g., chromium rinse tank 1, as chromium, chromic acid, chromium chromates and other metallic chromates.

Not only does the process of this invention provide for removing such chromium materials, but it also provides for recovering them and regenerating them in a form in which they are suitable for direct reuse in the chromium plating and dipping procedures. The process of this invention is amenable for the direct precipitation of chromium from waste solutions either in a batch-type procedure or in a continuous process in a manner which avoids the presence of an undesirably high concentration of residual barium in the waste water and effectively precipitates substantially all of the chromium materials present in the waste solutions. Residual barium, which can be present, can be removed readily by addition of sulfuric acid plus filtering thus simultaneously converting the soluble barium to an insoluble form ($BaSO_4$ - barium sulfate) and converting the barium chromate to chromic acid for reuse in the plating procedures. The precipitated barium is then filtered from the resulting waste water through a fine, acid-resistant filter material preferably having openings within the 1 to 3 micron size. In rendering insoluble any residual barium, the pH of the aqueous waste material should be elevated with a base, e.g., ammonium hydroxide, sodium hydroxide, etc., to a pH of approximately 6.5 prior to recycling to the plating process or dip tanks(s), or discharged through the local sewer system.

The process of this invention, while it does call for controlled parameters regarding concentration of barium carbonate to be used based on the amount of chromium materials present as well as the regulation, on a weight basis, of the barium carbonate to the acetic acid utilized and the pH at which the direct precipitation procedure is conducted; has an unusually favorable combination of salient advantages, which combination is possessed by no other chromium removal and recovery procedure of which the inventor is aware. These composite advantages can be stated briefly as follows: The process permits the direct precipitation, removal and recovery of substantially all of the chromium present in the waste aqueous media. The recovery procedure is substantially sludge-free and permits the removal and recovery processing to be conducted without undue clogging of the filters and without the necessity for using secondary or settling tanks to assist in the removal and recovery procedure. The present process thus permits ready and swift filtration removal of chromium and also single-stage precipitation and removal of any residual or excess barium present after removal of the chromium.

Any concentration of chromium in any volume of aqueous waste media can be removed, viz., this process can handle the removal and recovery of chromium in a wide varying concentration. Thus, this process can be used to handle chromium removal in a wide variety of waste solutions and aqueous media. Since the chromium (and barium) can be precipitated, filtered and removed without requiring considerable periods of time and additional processing apparatus, e.g., secondary holding or settling tanks; the process can be utilized in a continuous removal and recovery procedure wherein the chromium can be recycled for direct use in the primary industrial processes of plating.

Thus, the present invention offers both an environmentally sound and economical process for removing and recovering chromium materials from industrial waste solutions.

Prior to addition of the barium carbonate and acetic acid treating materials to the chromium waste waters flowing in line 2 to chromium treatment tank 3, it is necessary to determine the amount of chromium present in the industrial waste waters. The reason for this is to known how much barium carbonate and acetic acid to add. Thus, analysis of the chromium material-containing industrial waste solution is conducted to determine the chromium content thereof. Once the chromium content in the waste water is known, the barium carbonate and acetic acid are combined together, added immediately to the chrome-industrial waste water in treatment tank 3 and then agitated vigorously prior to and during filtering. The treated waste water is passed from treatment tank 3 to filter 5 via line 4.

The barium carbonate should be employed in a weight ratio, based upon the chromium material present, ranging from about 1.5 to 3.5 weight parts of barium carbonate per weight part of chromium. Usually the weight ratio of barium carbonate to chromium present ranges from about 1.8 to 2.2:1. Preferably, as indicated hereinabove, the weight ratio of barium carbonate to chromium present is approximately 2.0:1. On the other hand, the weight ratio of barium carbonate to acetic acid (preferably in the form of glacial acetic acid) ranges from about 2 to 4:1, and preferably the weight ratio of barium carbonate to acetic acid is approximately 3:1.

The pH of the chromium waste water-treating media solution during precipitation of the chromium ranges from about 3.0 to about 6.0. Usually the pH of said chromium waste water treating media solution during chromium precipitation ranges from about 4.2 to 5.0 and preferably said pH ranges from about 4.5 to 4.7. The optimum stabilized pH is approximately 4.6 for handling most chrome waste water in accordance with the process of this invention.

While a variety of acid resistant filtering media (resistant to acid within pH ranges of 2 to 5) can be employed in filter 5 to filter the precipitated chromium material from the waste solution, the use of synthetic organic plastic fibrous materials, such as polyesters, polyamides, polyethylenes, etc., e.g., a "Dacron" (polyester) fiber filter or equivalent is preferred. Such filters should be utilized having openings ranging from about 0.5 to 6 microns and preferably having openings within the range of 2 to 4 microns.

Any residual barium present in the waste treating solution in an amount excessive to given environmental standards can be removed readily by addition of sulfuric acid to the industrial waste water accompanied with filtering through a fine, acid-resistant filter having openings within the range of about 1 to 3 microns. The addition of the sulfuric acid also converts the precipitated chromium to a form in which it can be directly reused as chromic acid for plating in the primary industrial plating procedures.

Moreover, the resulting waste water can be reused for plating subsequent to the removal of barium and filtration. For sewer disposal, however, the pH thereof should be elevated with a basic substance, e.g., ammonium hydroxide, sodium hydroxide, etc., to a pH of approximately 6 to 7, e.g., more usually between 6.5 to 7. Although not absolutely necessary, prior to recycling the waste water for use in the plating processing tank(s), the pH can also be raised in a like manner.

In order to obtain intimate contact between the chromium material present in the industrial waste solutions and the treating aqueous media of barium carbonate and acetic acid, it is preferable to agitate the solutions vigorously, e.g., by use of air agitation, mechanical agitation, manual agitation, or other suitable agitation procedure. The thus-contacted and reacted solutions can be filtered immediately using an acid-resistant filter material, e.g., a "Dacron" (polyester) fiber filter having openings preferably within the 2 to 4 micron range.

A further advantage of this invention is that all of the waste water can be recycled for use over and over again as rinse water in the primary plating procedure and all of the chrome can be recovered as chromic acid in its comparatively pure state.

In varying the concentration of acetic acid utilized in chromium material precipitation, care should be exercised to avoid adding too much acetic acid. Excess acetic acid can result in untoward reaction with the chrome present forming chromium acetate which is a soluble form of chromium. In this regard it is hypothesized that since the weak electrolyte conducts ions, viz., acetic acid, its function in the chromium removal and precipitation process is critical to the process of changing the soluble barium carbonate to insoluble barium chromate. Also this avoids the necessity to break down the metallics and other impurities which may be precipitated out along with the chromium because the weak acid doesn't have an adverse affect on them, viz., doesn't convert them to the soluble acetate state. Thus, the other metals (present as chromates) are also captured on the filter and rendered insoluble in a sufficient manner to permit them to be filtered and thus removed on the 2 to 4 micron filter media.

Experience in conducting the present process indicates that about 10% of the barium added to precipitate the chromium is present in the filtered solution as soluble barium acetate. As noted above, this can be removed readily by passing the filtered solution through line 6 to barium treatment tank 7 where sulfuric acid is added to form insoluble barium sulphate, which can then be filtered by passing through line 8 into filter 9 readily using an acid-resistant fibrous filter of the same type described hereinabove but having approximately 1 to 3 micron size openings. The filtered clear waste water can then be recycled directly or sent to discharge. However, as noted above, it is preferable to elevate the pH thereof to a pH ranging from about 6.5 to 7.0 by adding the caustic soda, etc.

EXAMPLE I

Nine ounces of pure liquid soluble chrome, as chromic acid were added to approximately 20 gallons of water contained in a plastic barrel to stimulate an aqueous waste media having a determined amount and concentration of soluble chromium material.

In a separate plastic container, 18 oz. of barium carbonate was added to a small amount, viz., approximately 1 quart of water. Then 6 oz. of glacial acetic acid was added thereto and all of this aqueous treating media was then added to the 20 gal. of chrome water, which was then agitated.

The pH thereof was then adjusted to approximately 4.6 by addition of 6 oz. of ammonium hydroxide. Agitation was continued and filtration of the precipitated material was conducted (while agitation of the remainder of solution was continued) by passing same through a "Dacron" fiber filter media having 2 to 4 micron openings.

After filtering approximately 6 gallons of treated chrome waste solution through the "Dacron" filter, a 25 ml sample was taken for analysis as to chromium content. A second sample was taken after approximately 12 gals. passed through the filter and a third sample was taken as the last (20th) gal. was filtering out of the barrel. These three liquid sampls were then analyzed for chromium with the below tabulated analytical results. Analyses were conducted on a "Spectronic 20" analyzer manufactured by Bausch & Lomb using 20 calibrations at a photoelectric light setting of 545 nm (for measuring chromium content) with one-half inch test tubes.

TABLE I

| SAMPLE | *TEST READING | WT % CHROME |
|---|---|---|
| First | 100 | None |
| Second | 97 | 0.012 |
| Third | 100 | None |

*A reading of 100 means no chrome

EXAMPLE II

The procedure of Example I was repeated using the 20 gals. of aqueous waste solution obtained at the end of the chromium precipitation, filtration and removal as set forth in accordance with Example I, after filtration thereof and passing into another 20 gal. barrel. Then another 9 oz. of pure chromium liquid was added to this water along with the same amount of barium carbonate (18 oz.) and acetic acid (6 oz.) and ammonium hydroxide (6 oz.) accompanied by vigorous agitation as in Example I.

Three additional samples were taken in the same manner as noted previously in respect of Example I. In each sample jar approximately 15 ml of sulfuric acid was added to remove any residual barium left in the solution after filtering to remove the chromium precpitate (barium chromate). It was observed that a precpitate formed (insoluble barium sulphate) and substantially all of the barium dropped out of solution to the bottom of each respective sample jar.

The pH of the filtered, sulfuric acid acidified aqueous waste water samples in each respective sample jar was elevated from approximately 3 to 5 to a pH of approximately 6.5 by the addition of ammonium hydroxide added drop by drop so as not to exceed the pH of 6.5.

These test samples were then sent for analysis, as in Example I, with the below-tabulated results:

TABLE II

| SAMPLE | TEST READING | WT % CHROME |
|---|---|---|
| Fourth | 98 | 0.006 |
| Fifth | 100 | None |
| Sixth | 100 | None |

EXAMPLE III

In accordance with the procedures outlined in Examples I and II, 12 oz. of chromic acid was added to 20 gals. of water to simulate actual waste water from a chrome-plating process. In a separate container, 24 oz. of barium carbonate was added to 2 pints of water. Then 8 oz. of glacial acetic acid was added in another pint of water. A gasing effect was noted. This barium carbonate-acetic acid aqueous treating media was then dumped into the chrome water previously prepared along with vigorous agitation. The pH of the water was measured after 10 minutes of agitation and the pH was in an approximately 4.5 to 4.7 range. No ammonium hydroxide was added because the pH was approximately within the preferred range. The chrome waste water-aqueous treating media mixture was then filtered using a "Dacron" filter media having openings in the 2 to 4 micron range while continuing to agitate. A test sample was pulled after filtering approximately 2 gals. of the treated waste water. A second test sample was pulled after filtering approximately 10 gals. thereof and the last test sample was pulled when approximately 17 gals, had been filtered.

The test samples were analyzed in accordance with Example I to yield the following below-tabulated results.

TABLE III

| SAMPLE | TEST READING | WT % CHROME |
|--------|--------------|-------------|
| One    | 98           | 0.012       |
| Two    | 100          | None        |
| Three  | 100          | None        |

EXAMPLE IV

This procedure was performed utilizing actual contaminated chrome waste water from a K-35-Z Udylite chrome plating process.

The chrome content of the waste water was analyzed to be approximately 5-½ oz. of chrome in the 5 gal. sample.

The treating aqueous media was prepared by mixing 11 oz. of barium carbonate in a pint of water. The 4 oz. of acetic acid was added thereto and the mixture was dumped into the chrome waste water (approximately 5 gals. of waste water). The waste water-treating media was agitated for 2 to 3 minutes and the ph was then measured and determined to be approximately 4.5–4.6. No ammonium hydroxide was added to elevate the pH as this was in the preferred range for conducting the process.

Filtration was started as the agitation of the chrome water-treating media mixture was continued. The first test sample was pulled after filtration of ½ gal. of the treated waste water through the "Daconr" filter having openings within the 2 to 4 micron range. The second test sample was pulled after filtering approximately 2 gals. thereof. The third test sample was pulled after filtering approximately 4 gals. thereof and the fourth and final test sample was pulled when about ½ gal. of the waste water-treating media mixture was left to undergo filtration. These test samples were analyzed in accordance with the procedure and utilizing the analyzer as set forth in Example I above.

The test results are tabulated hereinbelow in Table IV.

TABLE IV

| SAMPLE | TEST READING | WT % CHROME |
|--------|--------------|-------------|
| One    | 100          | None        |
| Two    | 100          | None        |
| Three  | 100          | None        |
| Four   | 100          | None        |

It will be observed that in the process conducted in accordance with Example IV, no ammonium hydroxide was added to bring the pH above the pH existing in the process. This is due to the fact that the actual treating materials and the concentrations and weight ratios utilized seem to stabilize a pH around approximately 4.6, which is the preferred pH for conducting the process. While this is a combined characteristic resulting from the specific aqueous industrial chrome waste water being treated, this is indicative that in many cases very little adjustment of pH will be required.

COLOR CHANGE PROCESS CONSIDERATIONS

One of the interesting facets of the process of this invention is the color change which occurs to the chromium waste water during precipitation with the barium carbonate-acetic acid aqueous media and subsequent filtration thereof. As the chrome waste water effluent from the plating or dipping tanks is passed for treatment, it exhibits a dirty or turbid red color. Upon contact with the barium carbonate-acetic acid aqueous media in the concentrations specified herein, this color dramatically changes to lemon yellow, indicating formation of the insoluble barium chromate. Then upon filtration, this yellow precipitate is removed by the filter and the ensuing effluent is a clear, transparent watery liquid.

What is claimed is:

1. A process for removing chromium from waste water comprising determining the chromium content thereof, contacting said chromium-containing water with barium carbonate and acetic acid in aqueous media at a pH ranging from about 3 to about 6 utilizing a weight concentration of barium carbonate to chromium present ranging from about 1.5 to 3.5:1 and a weight ratio of barium carbonate to acetic acid ranging from about 2 to 4:1 thereafter filtering the resultant insoluble chromium material with a first acid-resistant filter media having openings ranging from about 0.5 to 6 microns, recovering the filtered chromium and removing the barium present by contacting said chromium with sulfuric acid thereby converting said chromium to chromic acid and precipitating said barium as insoluble barium sulfate, passing said effluent from said sulfuric acid contact through a second acid-resistant filter material to remove insoluble barium sulfate therefrom, collecting the effluent from said second filter, and reusing its chromium content in a chromium plating process.

2. A process as in claim 1 which includes vigorously agitating the chromium-containing water and barium carbonate-acetic acid aqueous media.

3. The process as in claim 1 wherein the pH at the time of contacting the barium carbonate-acetic acid aqueous media with the chromium-containing water ranges from about 4.2 to 5.0.

4. The process as in claim 3 wherein the weight ratio of barium carbonate to chromium present ranges from about 1.8 to 2.2:1 and the weight ratio of barium carbonate to acetic acid is approximately 3:1.

5. The process as in claim 4 wherein the weight ratio of barium carbonate to chromium present is approximately 2:1 and the pH of said chromium-containing water and barium carbonate-acetic acid aqueous treating media ranges from about 4.5 to 4.7.

6. A process as in claim 5 wherein said first acid-resistant filtering media is a fibrous polyester having openings within the range of 2 to 4 microns.

7. A process as in claim 1 wherein said second acid-resistant filter material has openings within the range of about 1 to 3 microns.

8. A process as in claim 1 wherein the waste water effluent from said first acid-resistant filter is also treated with sulfuric acid to precipitate any residual barium present as barium sulfate, which is removed by a second acid-resistant filter, and wherein the waste water effluent is also reused in said chromium plating process.

9. A process as in claim 8 which includes elevating the pH of said waste water effluent to a pH ranging from approximately 6 to 7 prior to reuse.

* * * * *